US010576642B2

(12) United States Patent
Fukuoka et al.

(10) Patent No.: US 10,576,642 B2
(45) Date of Patent: Mar. 3, 2020

(54) MULTI-JOINTED ROBOT ARM

(71) Applicant: FUJI CORPORATION, Chiryu (JP)

(72) Inventors: Daisuke Fukuoka, Toyota (JP);
Shigefumi Suzuyama, Toyota (JP)

(73) Assignee: FUJI CORPORATION, Chiryu (JP)

( * ) Notice: Subject to any disclaimer, the term of this patent is extended or adjusted under 35 U.S.C. 154(b) by 299 days.

(21) Appl. No.: 15/128,208

(22) PCT Filed: Mar. 25, 2014

(86) PCT No.: PCT/JP2014/058298
§ 371 (c)(1),
(2) Date: Sep. 22, 2016

(87) PCT Pub. No.: WO2015/145576
PCT Pub. Date: Oct. 1, 2015

(65) Prior Publication Data
US 2017/0095936 A1 Apr. 6, 2017

(51) Int. Cl.
*B25J 18/04* (2006.01)
*B25J 9/00* (2006.01)
(Continued)

(52) U.S. Cl.
CPC ............ *B25J 18/04* (2013.01); *B25J 9/0009* (2013.01); *B25J 9/046* (2013.01); *B25J 18/00* (2013.01)

(58) Field of Classification Search
CPC . B25J 18/04; B25J 9/0009; B25J 9/046; B25J 18/00
(Continued)

(56) References Cited

U.S. PATENT DOCUMENTS 4,356,554 A * 10/1982 Susnjara ................. B25J 9/046
414/730
5,413,454 A * 5/1995 Movsesian ............... B25J 5/007
294/100
(Continued)

FOREIGN PATENT DOCUMENTS

JP 63-176092 U1 11/1988
JP 11-70487 A 3/1999
(Continued)

OTHER PUBLICATIONS

International Search Report dated May 27, 2014 in PCT/JP2014/058298, filed Mar. 25, 2014.

*Primary Examiner* — Victor L MacArthur
*Assistant Examiner* — Gregory Robert Weber
(74) *Attorney, Agent, or Firm* — Oblon, McClelland, Maier & Neustadt, L.L.P.

(57) ABSTRACT

A multi-jointed robot arm which enables the use of a small space, in which a first arm member is supported to be capable of rotation in relation to a pair of support members, which are provided to stand on a base member at a predetermined width interval, by a first joint, further, a second arm member is supported to be capable of rotation in relation to the first arm member by a second joint, in which the second arm member holds a robot hand which grips a work on an opposite side from the second joint, the first arm member includes a pair of side portions which join the first joint and the second joint, and a storage space into which the second arm member enters between the pair of side portions is provided.

13 Claims, 7 Drawing Sheets

(51) Int. Cl.
*B25J 18/00* (2006.01)
*B25J 9/04* (2006.01)

(58) Field of Classification Search
USPC .................................................. 74/490.01
See application file for complete search history.

(56) References Cited

U.S. PATENT DOCUMENTS

| | | | | | |
|---|---|---|---|---|---|
| 6,758,113 | B2* | 7/2004 | Choy | ................... | B65G 47/904 414/719 |
| 8,360,178 | B2* | 1/2013 | Goldenberg | ............. | B25J 5/005 180/65.8 |
| 8,434,384 | B2* | 5/2013 | Kang | ................... | B25J 19/0016 74/490.01 |
| 8,677,854 | B2* | 3/2014 | Lundberg | ................... | B25J 9/04 74/490.01 |
| 2005/0016313 | A1* | 1/2005 | Robertson | ............... | B25J 9/046 74/490.01 |
| 2006/0201274 | A1* | 9/2006 | Nakajima | ................ | E02F 3/38 74/490.01 |
| 2010/0061830 | A1 | 3/2010 | Kitayama et al. | | |
| 2010/0095799 | A1* | 4/2010 | Albin | ................... | B25J 15/0213 74/490.01 |
| 2011/0120252 | A1* | 5/2011 | Liu | ...................... | B25J 19/0079 74/490.01 |
| 2012/0011956 | A1* | 1/2012 | Lundberg | ................... | B25J 9/04 74/490.03 |
| 2012/0215358 | A1* | 8/2012 | Gettings | .................. | B25J 5/005 700/259 |
| 2012/0272774 | A1* | 11/2012 | Kirihara | ................. | B25J 9/0027 74/490.06 |
| 2013/0330162 | A1* | 12/2013 | Horinouchi | .............. | B25J 5/007 414/730 |
| 2018/0290249 | A1* | 10/2018 | Kschier | ................... | B25J 9/046 |

FOREIGN PATENT DOCUMENTS

| | | |
|---|---|---|
| JP | 2005-81447 A | 3/2005 |
| JP | 2007-7806 A | 1/2007 |
| JP | 2010-17796 A | 1/2010 |
| JP | 2010-64158 | 3/2010 |

* cited by examiner

MULTI-JOINTED ROBOT ARM

TECHNICAL FIELD

The present application relates to a multi-jointed robot arm capable of changing posture between an extended state and a folded state.

BACKGROUND ART

For example, in a case in which processing of a work is performed via a plurality of automatic processing machines, an automatic work conveyor or the like is used for delivering the work between the automatic processing machines. In the automatic work conveyor, since there is a distance between a conveyance position at which the work is held and moved and a processing location of the automatic processing machine, a multi-jointed robot arm which performs the delivery therebetween is used. PTL 1 discloses a multi-jointed robot arm which is used in a processing device. Specifically, in a multi-jointed robot arm which runs along a rail on the top portion of a machine tool, a first arm and a second arm are joined to a robot base via a first joint and a second joint, and a robot hand is attached to the tip of the second arm via a third joint. The delivery of the work to the machine tool is performed through the operation of the joints and the robot hand.

CITATION LIST

Patent Literature

PTL 1: JP-A-2010-64158

SUMMARY

In a multi-jointed robot arm of the related art, a plurality of arms are folded by including a first joint to a third joint, and the multi-jointed robot arm has a simple configuration in which the plurality of arms are merely folded via the joints. Therefore, in this configuration, a reduction in size to the automatic work conveyor for which there is an anticipated demand in future automatic processing machines and the like is not realized. In other words, in accordance with a reduction in the size of the automatic processing machine itself and further compacting of the overall processing facility which is provided with a plurality of the automatic processing machines and the like, it is considered that the conveyance space for the automatic work conveyor and the processing space in which the delivery of the work is performed will become narrower. Therefore, it is necessary for the multi-jointed robot arm which is the main constituent of the automatic work conveyor to be compact while enabling the delivery of the work over a certain distance.

Therefore, in order to solve the problem, an object of the present disclosure is to provide a multi-jointed robot arm which may be used in a small space.

A multi-jointed robot arm in an aspect of the present disclosure includes a pair of support members which are provided to stand on a base member at a predetermined width interval, a first arm member which is rotationally supported in relation to the pair of support members by a first joint, and a second arm member which is rotationally supported in relation to the first arm member by a second joint, in which the second arm member holds a robot hand which grips a work on an opposite side from the second joint, the first arm member includes a pair of side portions which include the first joint and the second joint on both end portions, and there is a storage space into which the second arm member enters between the pair of side portions.

Effects

It is possible to create a state in which the first arm and the second arm are extended, and a state in which the first arm and the second arm are folded through the operation of the first joint and the second joint, and the delivery of the work is performed by causing the robot hand to operate in accordance with a predetermined state change. The multi-jointed robot arm becomes more compact in the folded state due to the second arm member entering the storage space between a pair of upper arm portions, and can be used in a limited space.

DESCRIPTION OF EMBODIMENTS

Figure 1:
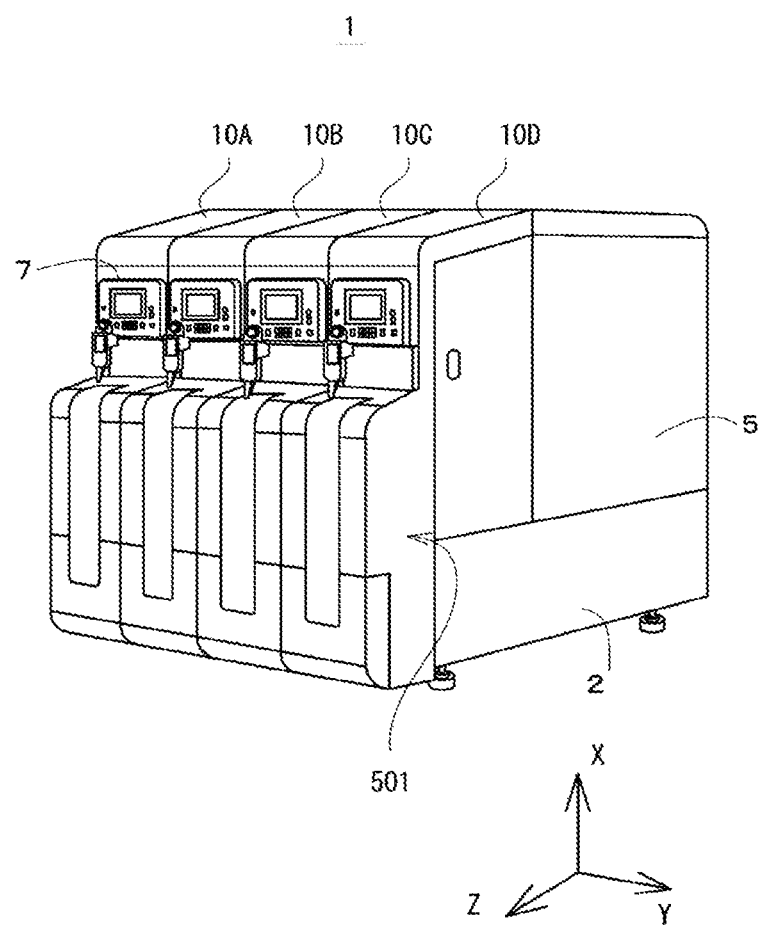
FIG. 1 is a perspective diagram illustrating a processing machine line formed of a plurality of machine tools.

Next, description will be given of an embodiment of the present disclosure hereinafter with reference to the drawings. First, FIG. 1 is a perspective diagram illustrating a processing machine line formed of a plurality of machine tools. Four machine tools 10 (10A, 10B, 10C, and 10D) are installed on a base 2 in a processing machine line 1. All four of the machine tools 10 are the same type of NC lathe, and have the same internal structure and overall shape and dimensions. An auto-loader (an automatic work conveyor) which performs the delivery of the work to each of the machine tools 10 is provided. Here, the "processing machine line" refers to a machine tool group in which an auto-loader performs the delivery of a work in a plurality of machine tools which have a fixed relationship.

In the machine tool 10 of the present embodiment, since the width dimension is narrow and the machine tools are arranged extremely close to each other, the overall processing machine line 1 is extremely compact. Therefore, an operation panel 7 is attached to the front surface portion of an exterior cover 5 to match the eye height of a worker, and the worker is positioned to be capable of checking not only the single operation panel 7, but also the adjacent operation panel 7. The entirety of the machine tool 10 is covered by the exterior cover 5, and a processing section is provided in the inner portion. A conveyance space of the auto-loader is provided in the inner portion of a front surface portion 501 of the exterior cover 5, and a delivery device is capable of moving between the four machine tools 10A to 10D.

Figure 2:
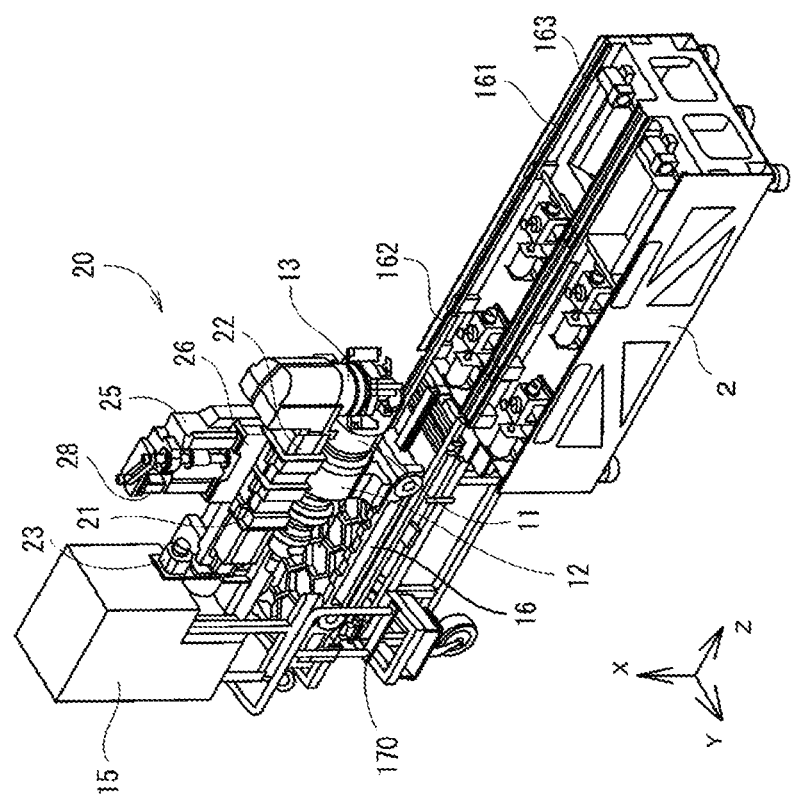
FIG. 2 is a perspective diagram illustrating a processing module which is an internal structure of the machine tool.

Next, FIG. 2 is a perspective diagram illustrating a processing module which is an internal structure of the machine tool 10. In the machine tool 10 from which the exterior cover 5 is removed, a processing module 20 is installed on the base 2 in a state of being capable of moving in the forward-backward direction. FIG. 2 illustrates a state in which the processing module 20 is pulled back to the rear. Since the rear of the exterior cover 5 which is attached to the base 2 is open, it is possible to pull the processing module 20 out from the rear. At this time, a wheeled table 170 is arranged at the rear of the base 2, and the processing module 20 of the base 2 may be transferred to the wheeled table 170. Since the front surface portion of the exterior cover 5 may be opened and closed, it is also possible to pull the processing module 20 out to the front. Furthermore, in each of the machine tools 10, it is possible to pull the processing module 20 out integrally with the exterior cover 5. Accordingly, although all of the machine tools 10A to 10D of the processing machine line 1 are assembled on the base 2 to form a single entity, each of the processing modules 20 which may be pulled out is independent.

Two rails 161 are installed on the base 2 in relation to one of the processing modules 20, and the processing module 20 is placed such that the wheels thereof are disposed on the rails 161. Therefore, due to the wheels rolling on the rails 161, the processing module 20 is capable of moving in the longitudinal direction of the base 2, that is, in the forward-backward direction of the machine tool 10. In particular, forward movement is configured to be capable of self propulsion. Specifically, a rack 162 with downward facing teeth is fixed to a movable bed 16, and a pulling motor 163 to which a pinion is mounted is fixed to a front portion of the base 2. The rack 162 is fixed to protrude forward from the movable bed 16, the rack 162 engages with the pinion when the processing module 20 is installed on the base 2, and the processing module 20 moves in the forward-backward direction due to the driving of the pulling motor 163.

Next, the machine tool 10 of the present embodiment is a turret lathe which is provided with a turret which holds a rotating tool such as an end mill or a drill, or a cutting tool such as a bite. Therefore, the processing module 20 is provided with a main spindle stand 12 provided with a main spindle chuck 11 which grips a workpiece (a work), a turret device 13 to which a tool is attached, a Z-axis drive device and an X-axis drive device which cause the turret device 13 to move along the Z-axis and the X-axis, a process control device 15 for controlling the drive section, and the like. Here, the Z-axis is a horizontal axis which is parallel to the rotating shaft (the main spindle) of the main spindle stand 12 which causes the held work to rotate. The X-axis is the movement axis which is perpendicular to the Z-axis and in which the tool of the turret device 13 is caused to progress and withdraw with respect to the Z-axis, and in the present embodiment, is a vertical direction. The X-axis direction is the up-down direction in both the machine tool 10 and the processing machine line 1 illustrated in FIG. 1.

So as to be capable of moving over the base 2, the processing module 20 is provided with the movable bed 16 which is provided with wheels, and the main spindle stand 12 is fixed onto the movable bed 16. The main spindle stand 12 is configured such that the main spindle chuck 11 and the main spindle-side pulley are integrated on the main spindle which is supported to rotate freely, and the rotation of the main spindle servomotor is applied. Meanwhile, the turret device 13 is installed on a Z-axis slide 22, and the Z-axis slide 22 is further installed on an X-axis slide 26. By sliding in the processing module base 21 which is fixed to the X-axis slide 26, the Z-axis slide 22 is configured to move freely in a horizontal direction which is parallel to the Z-axis.

In order to cause the Z-axis slide 22 to move in the Z-axis direction, a ball screw drive system which converts the rotational output of a Z-axis servomotor 23 into linear motion is adopted for the Z-axis drive device. In other words, a configuration is adopted in which the ball screw rotates due to the driving of the Z-axis servomotor 23, the rotational motion is converted into linear motion of the ball nut, and the Z-axis slide 22 moves in a direction which is parallel to the Z-axis.

A column 25 provided with two guides stands fixed to the movable bed 16, and the X-axis slide 26 is attached to slide freely in relation to the guides. The X-axis slide 26 is capable of being lifted and lowered along the columns, and a ball screw drive system is adopted for the X-axis drive device in order to convert the rotational output of the motor to the lifting and lowering motion of the X-axis slide 26. The ball screw rotates due to the driving of an X-axis servomotor 28, the rotational motion is converted into linear motion of the ball nut, and the lifting and lowering of the X-axis slide 26 becomes possible.

Figure 3:
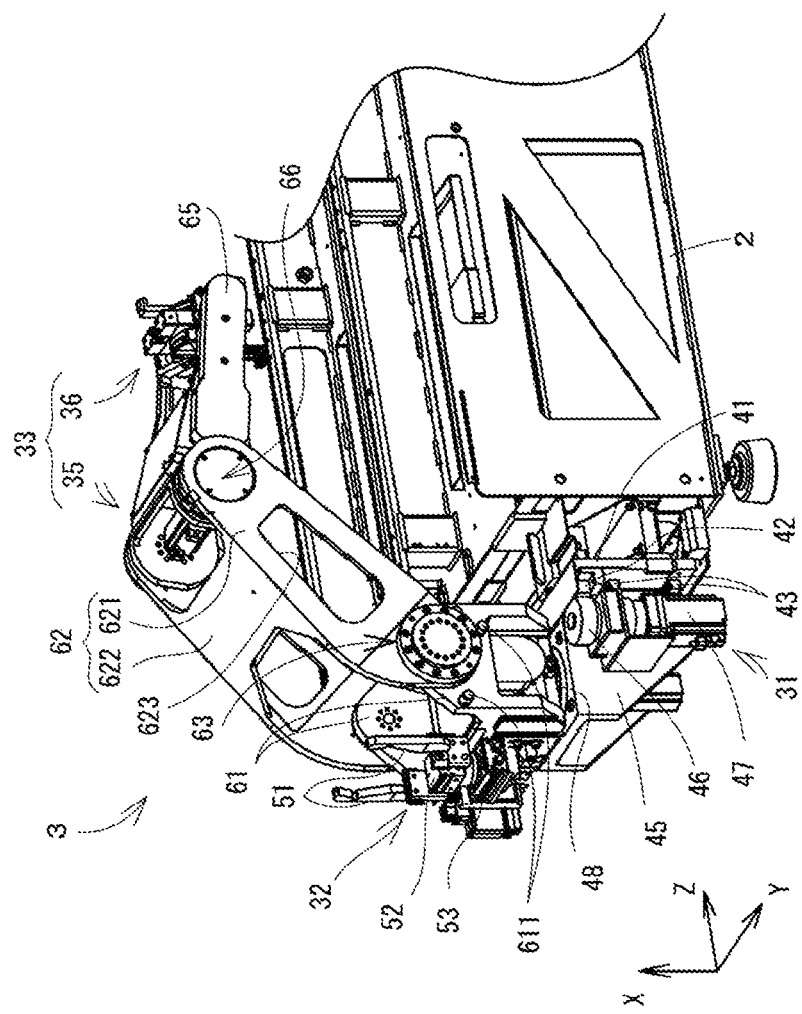
FIG. 3 is a perspective diagram which is an auto-loader which is provided in the processing machine line and illustrates a state in which a multi-jointed robot arm is extended.
Figure 4:
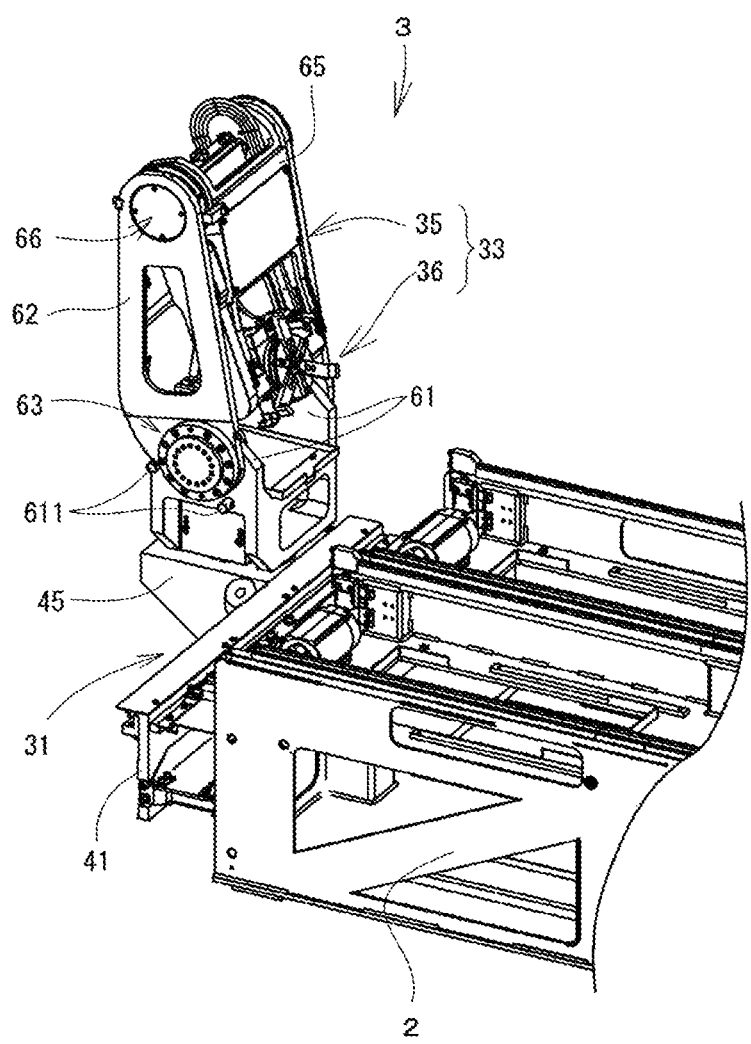
FIG. 4 is a perspective diagram which is the auto-loader which is provided in the processing machine line and illustrates a state in which a multi-jointed robot arm is folded.
Figure 5:
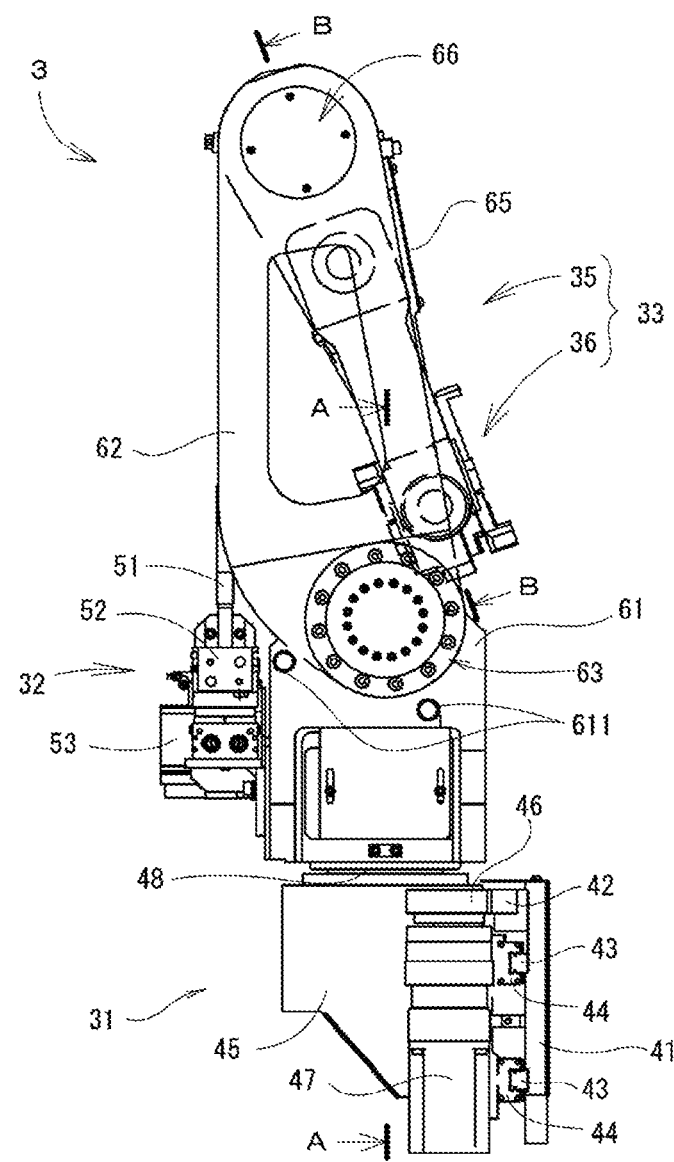
FIG. 5 is a side surface view illustrating an auto-loader.
Figure 6:
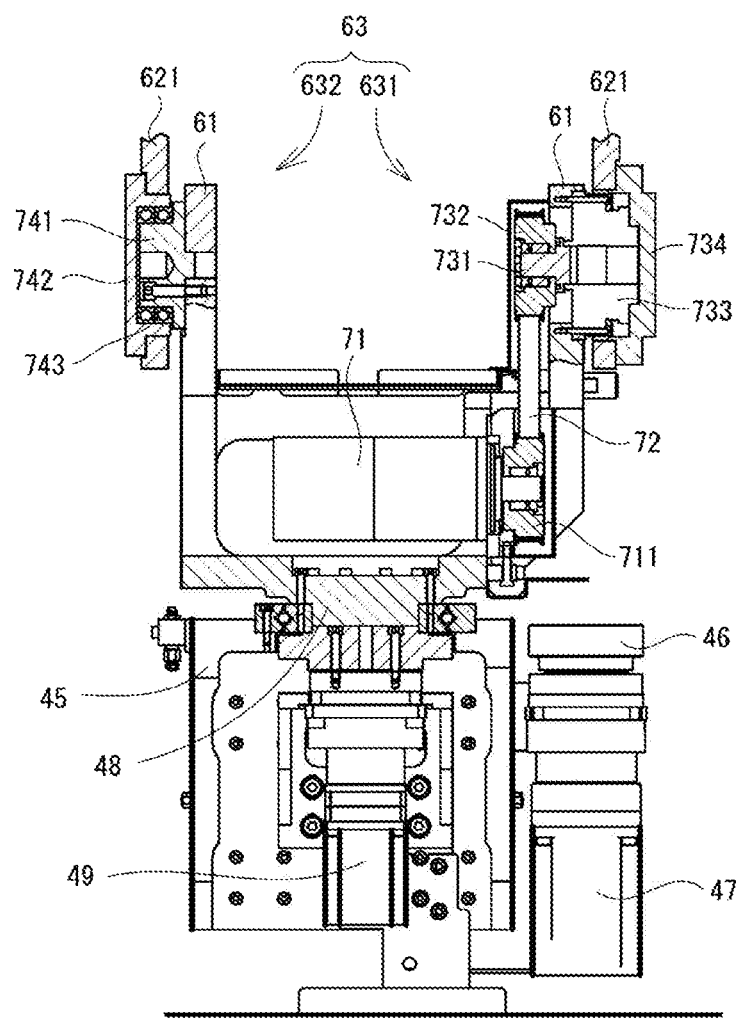
FIG. 6 is a partial sectional diagram of the auto-loader illustrated in FIG. 5 viewed from arrow A-A.
Figure 7:
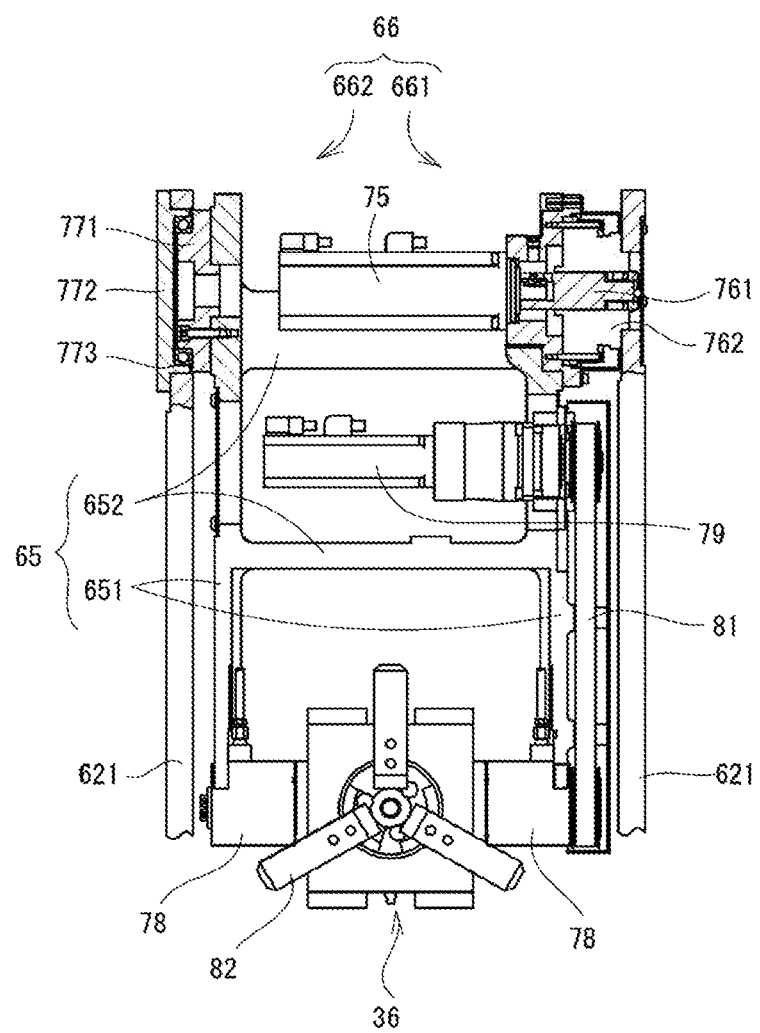
FIG. 7 is a partial sectional diagram of the auto-loader illustrated in FIG. 5 viewed from arrow B-B.

Next, description will be given of the auto-loader which is provided in the processing machine line 1. FIGS. 3 and 4 are perspective diagrams illustrating the auto-loader, FIG. 3 illustrates a state in which the multi-jointed robot arm is extended, and FIG. 4 illustrates a state in which the multi-jointed robot arm is folded. Furthermore, FIG. 5 is a side surface view illustrating an auto-loader 3. FIG. 6 is a partial sectional diagram of the auto-loader 3 illustrated in FIG. 5 viewed from arrow A-A, and FIG. 7 is a partial sectional diagram of the auto-loader 3 illustrated in FIG. 5 viewed from arrow B-B.

The auto-loader 3 is disposed on the front side of the processing machine line 1. Specifically, as described earlier, this is the inner portion of the front surface portion 501 of the exterior cover 5, and is a space which is provided on the front side of the base 2. In the auto-loader 3, a delivery device moves in the Y-axis direction in the space, and performs delivery of the work between the four machine tools 10A to 10D. FIGS. 3 and 4 illustrate the range of two of the machine tools. Here, drawings in which the exterior cover 5 is omitted are illustrated; however, in actuality, the auto-loader 3 is also contained inside the exterior cover 5.

Incidentally, in the auto-loader 3, the conveyance space is a narrow space inside the front surface portion 501 of the exterior cover 5 illustrated in FIG. 1. Therefore, in the auto-loader 3, there is a demand for a compact configuration. In the machine tools 10 which are adjacent to each other, each of the processing regions in which the work is processed is partitioned by the exterior cover 5. Therefore, the auto-loader 3 must perform the delivery of the work in a short width dimension in the Y-axis direction. Therefore, it is necessary for the auto-loader 3 to handle a narrow conveyance space and processing space, and, in particular, there is a demand for the multi-jointed robot arm of the auto-loader 3 to be configured to satisfy this demand.

First, the auto-loader 3 is provided with an inversion device 32 which inverts the work, a delivery device 33 for performing the delivery of the work between the inversion device 32, the machine tools 10, and the like, and a running device 31 on which the inversion device 32 and the delivery device 33 are installed and which runs between the plurality of machine tools 10. In a case in which the auto-loader 3 conveys the work, the delivery device 33 in the folded state illustrated in FIG. 4 moves between the machine tools 10A to 10D together with the inversion device 32 through the driving of the running device 31, and in a case in which it is necessary for the processing surface of the work to be inverted upside down, the work being conveyed is delivered to the inversion device 32 and inversion of the work is performed. The delivery device 33 changes shape from the folded state of FIG. 4 to the extended state of FIG. 3, and the delivery of the work to the machine tool 10 is performed.

Next, description will be given of each of the devices. In the running device 31, a supporting board 41 is fixed to the front surface portion of the base 2, and a rack 42 and two rails 43 which extend in the Y-axis direction, which is the direction from the machine tools 10A to 10D, are fixed to the supporting board 41. Meanwhile, a running slide 44 which slides in a state of gripping the rails 43 is fixed to a running stand 45. Therefore, the running stand 45 is capable of maintaining a fixed posture and moving in the Y-axis direction. A running motor 47 is provided on the running stand 45, and a pinion 46 which is fixed to a rotating shaft of the running motor 47 meshes with the rack 42. Therefore, if rotation is applied to the pinion 46 by the driving of the running motor 47, the running stand 45 moves in the Y-axis direction due to the pinion 46 rolling in the rack 42.

A rotary table 48 is attached onto the running stand 45 to rotate freely via a bearing. A rotary motor 49 is fixed to the inside of the running stand 45, and the rotary table 48 is joined to a rotating shaft of the rotary motor 49 via a deceleration device. The inversion device 32 and the delivery device 33 are installed on the rotary table 48. Therefore, through the rotation of the rotary table 48, the delivery device 33 is capable of changing not only the direction (the Z-axis direction) of the processing module 20, but is capable of changing the orientation to a work supply pallet or a work output pallet which is disposed on the outer portion in order to perform carrying in and out of the work to the processing machine line 1.

Next, the inversion device 32 which is installed on the rotary table 48 includes a left-right pair of gripping clasps 51, and a gripping cylinder 52 which causes the gripping clasps 51 to open and close is provided. Through the operation of the gripping cylinder 52, the pair of gripping clasps 51 approach each other to grip the work, and release the work by separating. A rotational actuator 53 which generates rotation using compressed air as a working fluid is provided under the gripping cylinder 52, and it is possible to cause the work which is gripped by the gripping clasps 51 to rotate by 180° on a level plane.

Next, the delivery device 33 is provided with a multi-jointed robot arm 35 which is capable of changing posture between an extended state and a folded state, and a robot hand 36 which is assembled onto the tip portion of the multi-jointed robot arm 35. In the multi-jointed robot arm 35, a pair of supporting plates 61 which are arranged at a predetermined interval are fixed to stand on the rotary table 48, an upper arm member 62 is joined to the top end portions of the supporting plates 61 via a first joint mechanism 63, and further, a front arm member 65 is joined to the upper arm member 62 via a second joint mechanism 66. Therefore, the multi-jointed robot arm 35 is configured to be capable of changing posture between the standing folded state illustrated in FIG. 4 and the extended state illustrated in FIG. 3 through the driving of the first joint mechanism 63 and the second joint mechanism 66.

In the upper arm member 62, a pair of upper arm plates 621 which are disposed in parallel are connected to each other by a horizontal bridging plate 622 which is perpendicular to the upper arm plates 621, and the upper arm member 62 has a solid shape. In particular, the horizontal bridging plate 622 is formed to join the front side end portions of the upper arm plates 621. Therefore, the upper arm member 62 is open to the rear side, that is, to the base 2 (the processing module 20) side, and, as illustrated in FIG. 4, a storage space into which the front arm member 65 enters is formed. A large weight reduction hole 623 for lowering the weight is formed in the center portion of the upper arm plate 621, and the horizontal bridging plate 622 is formed on a portion of the upper arm plate 621 in the longitudinal direction thereof. In this manner, by configuring the upper arm member 62 to be a solid shape, the storage space is obtained, rigidity is increased, and excess portions are cut off or the like to reduce the overall weight.

The upper arm member 62 is supported, in a state of being capable of rotation, by the pair of supporting plates 61 on the left and right of which the left and right pair of upper arm plates 621 are provided in the same manner. Specifically, the first joint mechanism 63 is provided between the supporting plate 61 and the upper arm member 62, and angle adjustment of the upper arm member 62 is performed. In the first joint mechanism 63, a first joint motor 71 is attached to the bottom side of the supporting plate 61, and a pulley 711 is fixed to a rotating shaft of the first joint motor 71. Meanwhile, a shaft 731 is provided to rotate freely on the top end portion side of the supporting plate 61, and a pulley 732 is fixed to the shaft 731. A timing belt 72 is caused to span between the pulley 711 and the pulley 732 which are disposed above and below respective to each other.

The shaft 731 is joined to a deceleration device 733 which is fixed to the top end portion of the supporting plate 61, and a rotation cover 734 which is disposed on the opposite side from the pulley 732 is joined to the deceleration device 733. The deceleration device 733 here causes the rotation of the first joint motor 71 which is input from the pulley 732 to decelerate, and outputs the decelerated rotation to the rotation cover 734 side. Since the upper arm plate 621 of the upper arm member 62 is fixed to the rotation cover 734, the rotation from the first joint motor 71 is transmitted to the upper arm member 62 via the deceleration device 733 and causes the upper arm member 62 to become inclined.

In the first joint mechanism 63, a drive-side rotation section 631 to which the rotation of the first joint motor 71 is transmitted, and another driven-side rotation section 632 are formed. In the driven-side rotation section 632, a shaft 741 with a large diameter is fixed to the top end portion of the supporting plate 61, and a rotation cover 742 is assembled onto the shaft 741 via a bearing 743. The upper arm plate 621 is fixed to the rotation cover 742. Therefore, if rotation is applied to the upper arm member 62 at the drive-side rotation section 631 side through the driving of the first joint motor 71, the rotation of the upper arm member 62 is supported in the other driven-side rotation section 632.

Next, in the upper arm member 62, the second joint mechanism 66 for causing the front arm member 65 to rotate is provided on the end portion of the opposite side from the first joint mechanism 63. In the front arm member 65, a left and right pair of parallel front arm plates 651 are connected by a horizontal bridging plate 652. The front arm member 65 is assembled so as to be interposed between the pair of upper arm plates 621 such that the front arm plate 651 is parallel with the upper arm plate 621. In other words, as illustrated in FIG. 7, the one end portion side of the front arm member 65 is joined to the upper arm member 62 by the second joint mechanism 66. The robot hand 36 is held on the other end portion side of the front arm member 65.

In the same manner as the first joint mechanism 63, a drive-side rotation section 661 is formed on one of the left and right of the second joint mechanism 66, and a driven-side rotation section 662 is formed on the other. In the drive-side rotation section 661, a second joint motor 75 is fixed to the front arm plate 651, and a rotating shaft of the second joint motor 75 is joined to a deceleration device 762 via a shaft 761. The deceleration device 762 here is fixed to both the upper arm plate 621 and the front arm plate 651, causes the rotation of the second joint motor 75 which is input from the shaft 761 to decelerate, and outputs the decelerated rotation to the front arm plate 651 side. Accordingly, the rotation from the second joint motor 75 is transmitted to the front arm member 65 via the deceleration device 762, and the front arm member 65 is caused to become inclined.

Meanwhile, in the driven-side rotation section 662, a shaft 771 with a large diameter is fixed to the end portion of the front arm plate 651, and a rotation cover 772 is assembled onto the shaft 771 via a bearing 773. The upper arm plate 621 is fixed to the rotation cover 772, and the shaft 771 is capable of rotating within the rotation cover 772. Therefore, if rotation is applied to the front arm member 65 at the drive-side rotation section 661 side through the driving of the first joint motor 71, the rotation of the front arm member 65 is supported in the other driven-side rotation section 662.

Next, the robot hand 36 is attached, to be capable of rotating, to the front arm plate 651 by rotation support sections 78 of both the left and right sides. In the rotation support section 78 of one side, a pulley is provided on a rotating shaft, and a belt 81 bridges between the pulley of the rotation support section 78 and the pulley of a hand motor 79 which is fixed to the front arm member 65. Therefore, the robot hand 36 rotates due to the driving of the hand motor 79, and angle adjustment is performed. The robot hand 36 includes a clamp mechanism in which three chuck pawls 82 are hydraulically operated, and is configured to be capable of gripping and releasing the work. The clamp mechanism is formed on the surface illustrated in FIG. 7, and on the surface of the opposite side.

In this manner, in the multi-jointed robot arm 35, the pair of supporting plates 61 are fixed to a base member (in the present embodiment, the rotary table 48) at a predetermined width interval, and using the pair of supporting plates 61 as base portions, the upper arm member 62 is joined via the first joint mechanism 63, and the front arm member 65 is joined via the second joint mechanism 66. The width dimension of the multi-jointed robot arm 35 is suppressed to a size in which the upper arm member 62 and the front arm member 65 may enter into the inner portion of the machine tools 10 which are surrounded by the exterior cover 5. In other words, the interval of the upper arm plates 621 which are positioned closest to the outside in the width direction is configured to correspond to the width interval of the machine tools 10.

The robot hand 36 is attached to the multi-jointed robot arm 35 at approximately the center portion in the width direction thereof. The robot hand 36 is rotationally supported from both sides in the width direction of the multi-jointed robot arm 35. The front arm member 65 which holds the robot hand 36 is formed to be a size which is smaller than the upper arm member 62, and which fits in the storage space of the upper arm member 62 as illustrated in FIG. 4. In the upper arm member 62, the size of the horizontal bridging plate 622 is reduced and a large opening portion is formed in the supporting plate 61 side, and it becomes possible to perform the delivery of the work to the inversion device 32 as though passing the work under a fork, for example, through a folding operation of the multi-jointed robot arm 35. In the supporting plate 61, a stopper 611 is formed on the outside surface, and the posture (the inclination) of the upper arm member 62 is fixed when between the extended state and the folded state of the multi-jointed robot arm 35.

Next, description will be given of the operations of the present embodiment. In the processing machine line 1, the work is removed from the supply pallet by the auto-loader 3, and is conveyed in order from the machine tool 10A to the machine tool 10D. In the machine tool 10, a tool corresponding to the processing content is selected through the indexing of the turret device 13. For example, in a hole-forming process, a rotating tool such as an end mill is selected, and rotation is applied to the rotating tool through the driving of a processing motor which is installed on the turret device 13. In a lathe turning process or a burr removal process, a cutting tool such as a bite is selected. The turret device 13 moves in the X-axis and Z-axis directions due to the X-axis drive device and the Z-axis drive device, the position of the tool in relation to the work which is set in the main spindle chuck 11 of the main spindle stand 12 is adjusted, and predetermined processing is performed.

In the auto-loader 3, the pinion 46 which rotates due to the driving of the running motor 47 rolls in the rack 42 to move in the Y-axis direction. At this time, due to the running slide 44 grasping the rails 43 and sliding, the posture of the delivery device 33 and the like is maintained and the auto-loader 3 moves. In the delivery device 33 which is being conveyed, the multi-jointed robot arm 35 is in the folded state illustrated in FIG. 4. The delivery device 33 stops in front of the machine tool 10 which is the target, and the delivery of the work is performed. During the delivery of the work, the multi-jointed robot arm 35 assumes the extended state illustrated in FIG. 3 from the folded state illustrated in FIG. 4. In other words, in the multi-jointed robot arm 35, the upper arm member 62 is inclined to the machine tool 10 (the base 2) side to assume a forward-inclined posture, and the front arm member 65 which comes out from the upper arm member 62 is disposed closer to the front than the upper arm member 62.

At this time, in the multi-jointed robot arm 35, the first joint motor 71 drives, the rotation thereof is transmitted to the shaft 731 via the timing belt 72, and is further transmitted to the upper arm member 62 via the deceleration device 733. Therefore, the upper arm member 62 assumes the forward-inclined posture illustrated in FIG. 3 from the standing state illustrated in FIG. 4. The second joint motor 75 drives, the rotation thereof is transmitted to the deceleration device 762 via the shaft 761, and the front arm member 65 rotates in relation to the upper arm member 62. Therefore, the front arm member 65 leaves the storage space in the upper arm member 62 from the stored state illustrated in FIG. 4, and is fed forward as illustrated in FIG. 3. Through this extended state, the robot hand 36 is caused to approach the main spindle chuck 11 of the machine tool 10. Meanwhile, the folded state illustrated in FIG. 4 is restored from the extended state illustrated in FIG. 3 by causing the first joint motor 71 and the second joint motor 75 to rotate in reverse.

In the delivery of the work, through the driving of the hand motor 79, the rotation thereof is transmitted to the rotation support sections 78 via the belt 81. Therefore, the robot hand 36 rotates, and angle adjustment is performed. In the robot hand 36, due to the supply and expulsion of a hydraulic oil, the three chuck pawls 82 move in a radial direction, and the gripping and releasing of the work is performed. In a case in which processing is performed on both the obverse and reverse sides of the work, the work is delivered from the delivery device 33 to the inversion device 32. In the delivery, as described earlier, the multi-jointed robot arm 35 assumes the folded state, and the work which is gripped by the robot hand 36 passes a bottom opening portion of the upper arm member 62, and is fed to the inversion device 32.

In the multi-jointed robot arm 35 of the present embodiment described above, the upper arm member 62 includes a storage space, and it is possible to create a state in which the multi-jointed robot arm 35 is folded such that the front arm member 65 which holds the robot hand 36 fits in the storage space. Therefore, the multi-jointed robot arm 35 becomes compact, and it is possible to cause the delivery device 33 to move even in a narrow conveyance space which is covered by the front surface portion 501 of the exterior cover 5. In the state in which the multi-jointed robot arm 35 is extended, it is possible to perform delivery of the work between the multi-jointed robot arm 35 and the main spindle chuck 11 of the machine tool 10 which is in a distanced position.

In a case in which the multi-jointed robot arm 35 is viewed from the width direction, the robot hand 36 is disposed on approximately the middle portion of the multi-jointed robot arm 35, and both ends are supported. The multi-jointed robot arm 35 is configured to support, in addition to its own weight, the robot hand 36 and the weight of the work on both sides to the left and right. Therefore, it is possible to reduce the load applied to the portions of the multi-jointed robot arm 35, and it becomes possible to reduce the weight or to reduce the size of the members of the portions and the device. From this perspective, in the upper arm member 62, the storage space is obtained, and the rigidity is improved by the solid shape. A reduction in weight is obtained by cutting excess portions from the upper arm plate 621 to an extent which does not influence the rigidity, and since the load on the first joint motor 71 is reduced, this contributes to a reduction in the size of the motor. The load on the running motor 47 is reduced due to the reduction in the weight of the delivery device 33, and this contributes to a reduction in the size of the motor.

In the present embodiment, the multi-jointed robot arm 35 is configured to be partnered with the machine tool 10. In particular, the machine tool 10 is short and compact in the width dimension, and the main spindle chuck 11 which is the partner which performs the delivery of the work is disposed in substantially the vicinity of the center in the width direction. The multi-jointed robot arm 35 is useful for performing work through such a narrow width. The multi-jointed robot arm 35 enables delivery of the work not only to the machine tool 10 side, but also to the inversion device 32 which is disposed on the opposite side.

Although description of an embodiment of the present disclosure is given above, the present disclosure is not limited thereto, and may be subjected to various modifications in a range not departing from the gist of the present disclosure. In the embodiment described above, description is given indicating a multi-jointed robot arm which is embedded in the processing machine line 1; however, the multi-jointed robot arm of the present disclosure is not limited to forming a delivery device. The configuration of the multi-jointed robot arm is also not limited to the embodiment described above. For example, the front arm member 65 supports both ends of the robot hand 36 using a pair of left and right front arm plates; however, the front arm member 65 may support one side. In the upper arm member 62, the transmission of power between the pair of upper arm plates 621 is performed by the horizontal bridging plate 622. From this perspective, as long as rigidity in relation to the transmission of power may be obtained, for example, a narrow width plate material may be provided on the side end portion of the front arm member 65 instead of the horizontal bridging plate 622, or alternatively, the horizontal bridging plate 622 may be omitted to cause the front arm member 65 to perform. Accordingly, it is possible to cause the upper arm member 62 to be greatly inclined to the opposite side from the inclination illustrated in FIG. 3.

REFERENCE SIGNS LIST

1: processing machine line, 2: base, 3: auto-loader, 5: exterior cover, 10: machine tool, 11: main spindle chuck, 31: running device, 32: inversion device, 33: delivery device, 35: multi-jointed robot arm, 36: robot hand, 61: supporting plate, 62: upper arm member, 621: upper arm plate, 622: horizontal bridging plate, 63: first joint mechanism, 65: front arm member, 66: second joint mechanism.

The invention claimed is:

1. A multi-jointed robot arm comprising:
a pair of support members which are provided to stand on a table at a predetermined width interval;
a first arm member which is rotationally supported in relation to the pair of support members by a first joint;
a second arm member which is rotationally supported in relation to the first arm member by a second joint; and
a motor configured to move the first arm member rotationally in relation to the pair of support members, the motor including a rotating shaft that is disposed both (1) between the table and the first joint and (2) outside of the first joint, wherein
the second arm member holds a robot hand which grips a work on an opposite side from the second joint,
the first arm member includes a pair of side portions which include the first joint and the second joint on both end portions, and
there is a storage space into which the second arm member enters between the pair of side portions such that when a majority of the second arm member enters the storage space the robot hand is located closer to the first joint than the second joint.

2. The multi-jointed robot arm according to claim 1, wherein
the pair of support members are two parallel supporting plates, and
in the first arm member:
a pair of parallel side surface plates which correspond to the side portions are joined by a horizontal bridging material which bridges in a width direction, and
the storage space in which three directions are surrounded by the pair of side surface plates and the horizontal bridging material is formed.

3. The multi-jointed robot arm according to claim 2, wherein
in the first arm member, weight reduction holes are formed in the pair of side surface plates, and
the horizontal bridging material is a plate which is connected to a portion of the side surface plates in a longitudinal direction.

4. The multi-jointed robot arm according to claim 1, wherein the second arm member is a member in which a parallel pair of side surface plates are joined by a horizontal bridging material in the width direction.

5. The multi-jointed robot arm according to claim 4, further comprising a motor configured to move the second arm member rotationally in relation to the first arm member and disposed in between the pair of side surface plates.

6. The multi-jointed robot arm according to claim 5, wherein the motor is disposed within the second joint.

7. The multi-jointed robot arm according to claim 4, wherein a portion of the robot hand is always disposed in between the pair of side surface plates.

8. The multi-jointed robot arm according to claim 1, wherein the table is a rotary table.

9. The multi-jointed robot arm according to claim 1, wherein the entire motor is disposed between the table and the first joint.

10. The multi-jointed robot arm according to claim 1, further comprising a belt connecting the rotating shaft and the first joint.

11. The multi-jointed robot arm according to claim 10, further comprising a first pulley connected to the rotating shaft,
wherein the first joint includes:
a shaft, and
a second pulley connected to the shaft.

12. The multi-jointed robot arm according to claim 11, wherein the belt connects the first pulley and the second pulley.

13. The multi-jointed robot arm according to claim 11, wherein the second pulley is disposed above the first pulley.

\* \* \* \* \*